Figure 1:
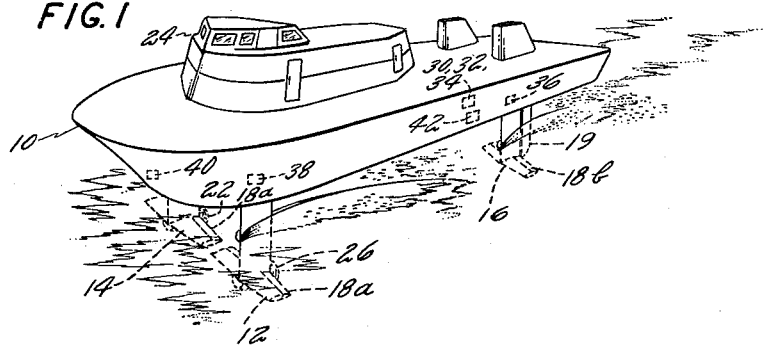

Nov. 10, 1964 H. R. ASK 3,156,209
AUTOPILOT FOR HYDROFOIL CRAFT
Filed July 6, 1962 8 Sheets-Sheet 1

INVENTOR
HENRY R. ASK
BY Donald J. Bradley
AGENT

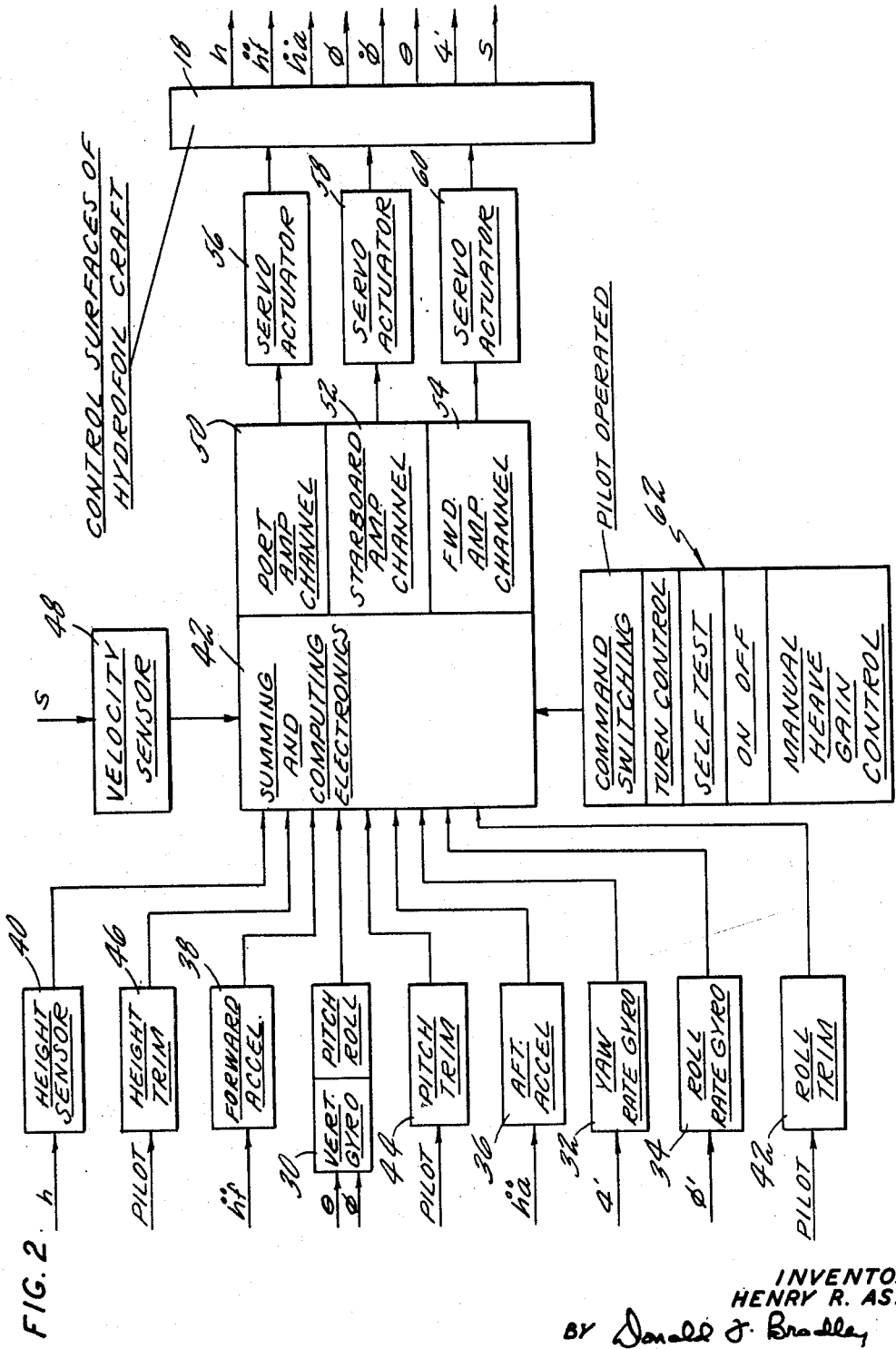

Nov. 10, 1964  H. R. ASK  3,156,209
AUTOPILOT FOR HYDROFOIL CRAFT
Filed July 6, 1962  8 Sheets-Sheet 3
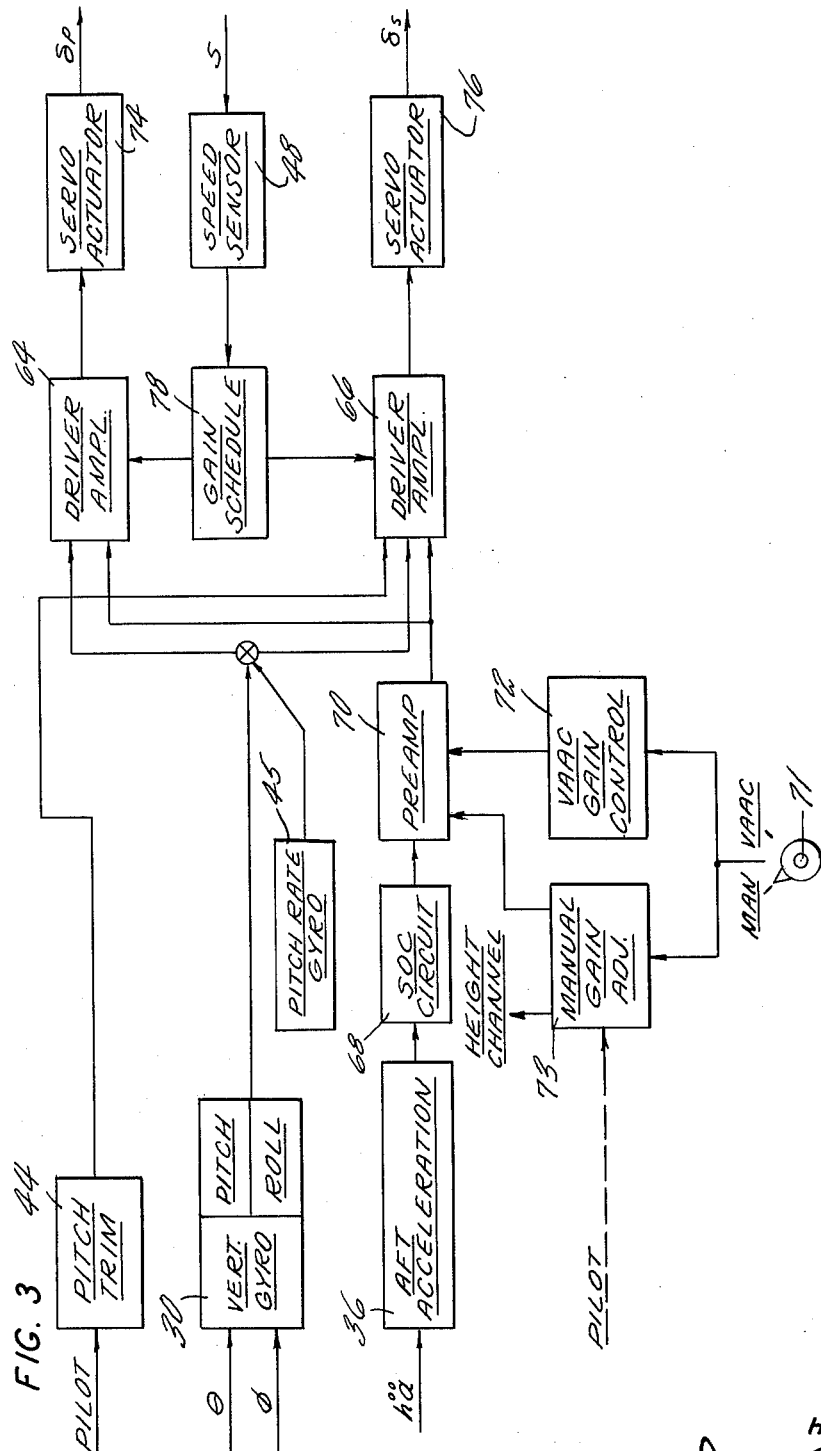

Nov. 10, 1964   H. R. ASK   3,156,209
AUTOPILOT FOR HYDROFOIL CRAFT
Filed July 6, 1962   8 Sheets-Sheet 4

FIG. 4

INVENTOR
HENRY R. ASK
BY Donald J. Bradley
AGENT

INVENTOR
HENRY R. ASK
BY Donald J. Bradley
AGENT

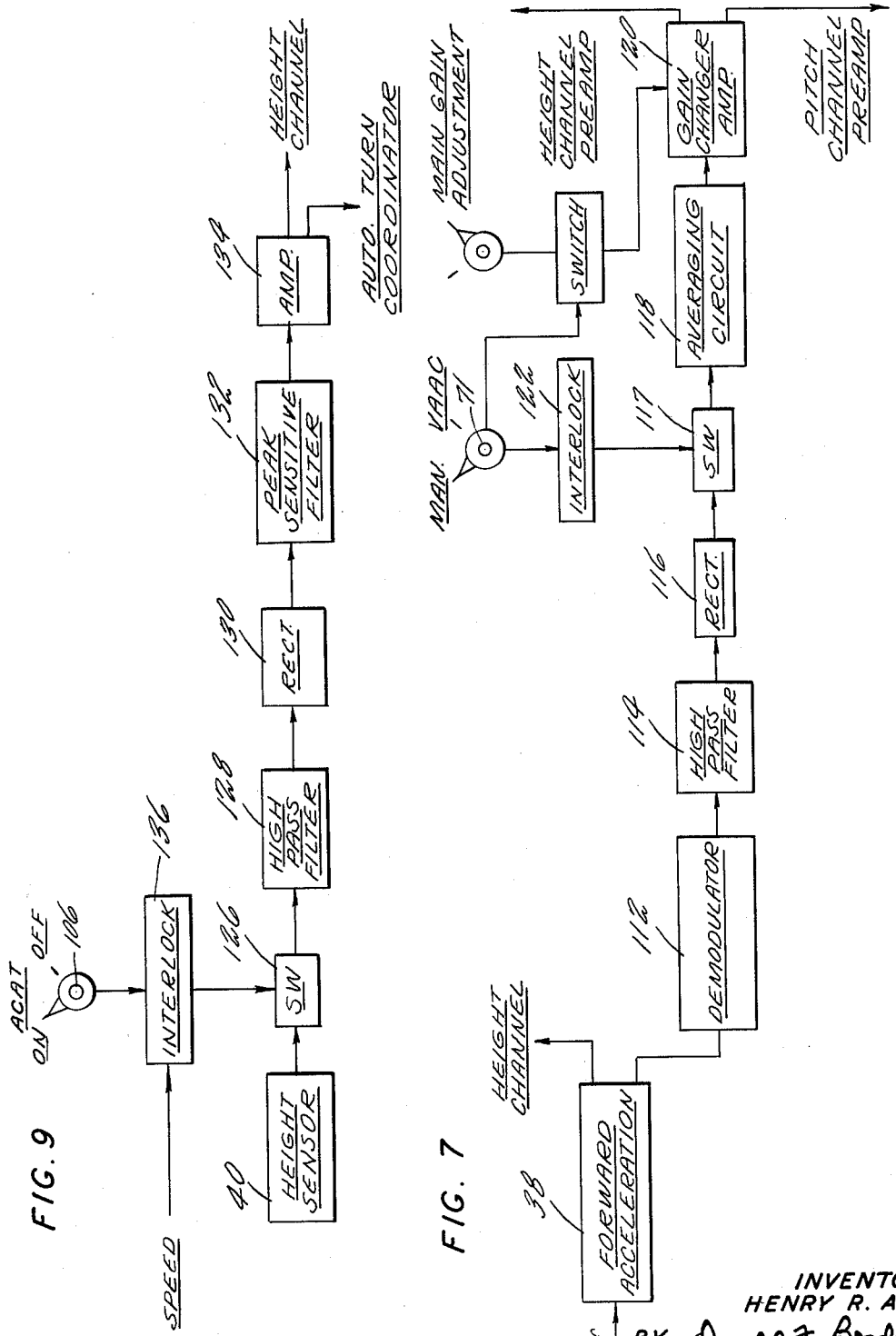

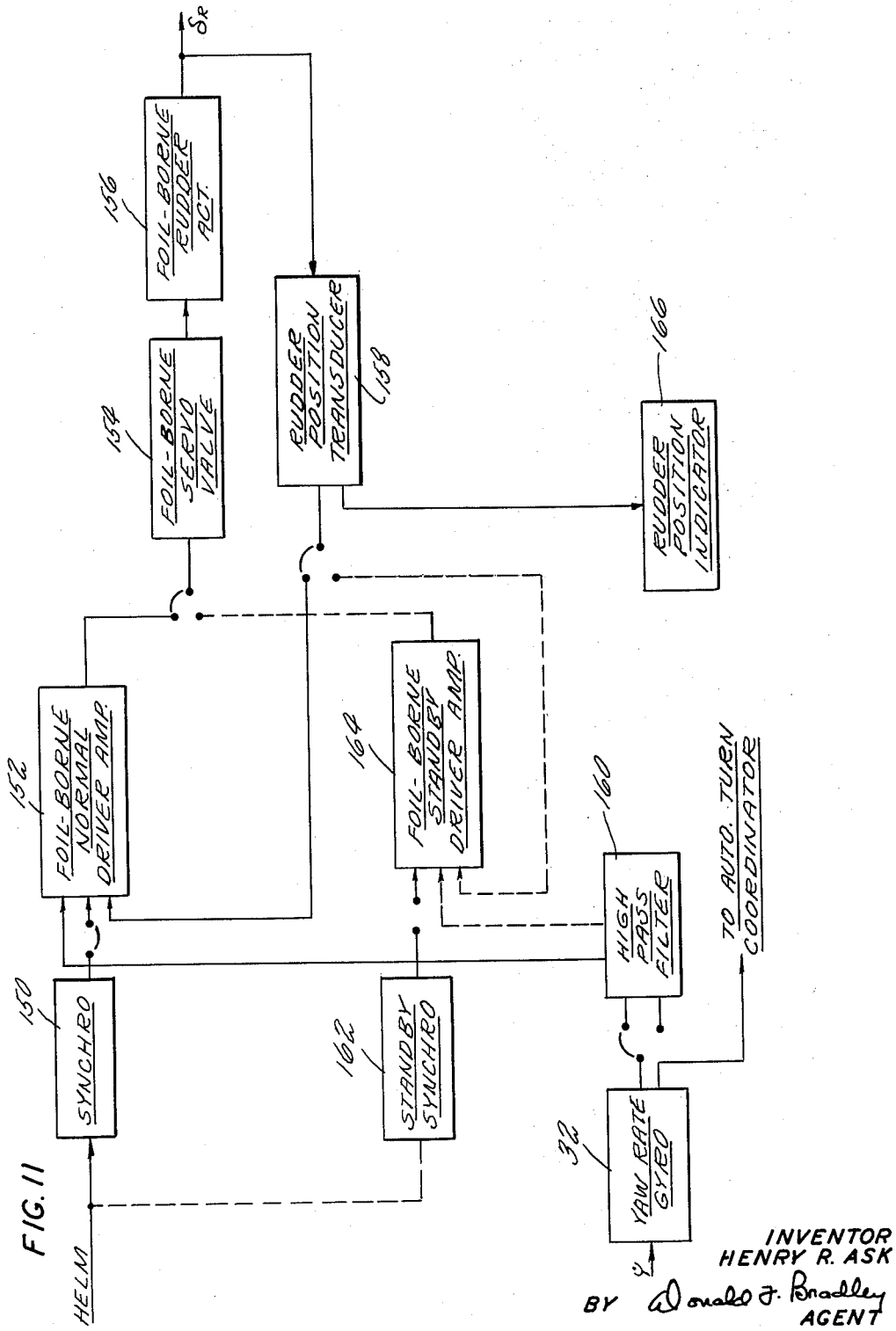

3,156,209
AUTOPILOT FOR HYDROFOIL CRAFT
Henry R. Ask, Wapping, Conn., assignor to United Aircraft Corporation, East Hartford, Conn., a corporation of Delaware
Filed July 6, 1962, Ser. No. 207,881
17 Claims. (Cl. 114—66.5)

This invention relates to an autopilot for a hydrofoil craft and particularly to an automatic control system which stabilizes the craft in pitch, roll, and altitude.

Through the years, improvements have been made in providing the surface ship with the ability to achieve greater speed. Some improvements have been made due to the mere addition of power to existing ships. Unfortunately, the propulsion power required by the conventional hull increases as a power of the speed, and the brute force application has not been satisfactory. The hydrofoil approach has been to avoid the barrier of costly wave-making resistance by lifting the hull of a boat or ship out of the water. This has been accomplished by the use of a lifting surface on hydrofoils which fly just under or penetrate the water surface and generate enough lift to hold the hull clear of the water. The hydrofoil has several advantages which provide the high speed capability. These are a reduced resistance which permits a greater maximum speed for a given power, a more comfortable ride, and sea-keeping characteristics that permit maintaining speed in a severe sea condition. Aerospace Engineering, March 1961, p. 10 et seq. gives a complete analysis of hydrofoils, and the article also reviews the state of hydrofoil technology at the present time.

As the hydrofoil ship builds up speed, the resistance of the hull and foils also increases rather rapidly to a maximum. When the lift generated on the foils exceeds the weight of the ship, the hull is lifted clear of the water and the total resistance decreases to that of drag of the foils and struts alone. The resistance is approximately constant for some speed ranges but eventually increases again. The maximum speed is reached at the limit of the installed power.

The most peculiar feature of the hydrofoil craft is the presence of the foils with the shape of aircraft wings, but much smaller. The propulsive power for hydrofoil craft will be supplied by lightweight internal combustion engines or gas turbines converted from aircraft use for marine application. High power is required for high speed. A more conventional power plant such as a diesel may be provided for inboard maneuvering and for low speed cruising in the hull-borne condition. Most hydrofoil craft utilize gearing for either right-angled drive or inclined shafting since the power of the engines in the hull must be transmitted to propellers that must remain with good submergence even when the boat is flying at its greatest height.

The size of the hull and its take-off speed dictate the shape of the hull. Unless special devices such as auxiliary foils, ladder foils, or some type of retractable flaps are used, the take-off speed of such a craft is about one-half of the top speed. A very large craft with moderate top speed will probably employ hull lines that are quite conventional, probably destroyer-style, for operating in a speed-length regime where displacement-type operation is an advantage. If, however, the craft is smaller, or if the top speed is much higher, a planing-type hull will probably be used, with perhaps a little more deadrise than would be normal to cut down on impact loads on the bottom. The topside of the craft will be much cleaner aerodynamically than most other ships, since at top speed the air drag of the hull may be a significant part of the total drag.

As the craft increases speed and the hull starts to rise from the water, the main problems are stability and control. At the instant the hull leaves the water, the foils carry the weight of the ship at the minimum possible flying speed, and the greatest steady-state lift coefficient is reached. In this condition the main engines must develop virtually all their available thrust. The absolute value of drag at this condition is at a maximum value which will not again be equaled until the craft has attained nearly its top speed.

The foil plans of all the hydrofoil craft constructed up to the present time may be classified in two ways: first, whether the lifting surface pierces the water surface or is submerged at all times; and the second, by the longitudinal distribution of the foil area in the canard, tandem, or airplane type. Characteristically, the airplane configuration is more inherently stable than the tandem or canard, while the canard system is more agile. For optimum distribution of foil loading, the center of gravity of the craft should be near the center of area of the foil system.

The surface-piercing or area-stabilized systems have the foils essentially fixed in attitude with respect to the hull and depend upon variations in area of the foil in water to supply added lift as needed. The lift coefficient remains substantially constant. This capability is built into the system by the use of dihedral foils or by multiple small foils arranged ladderwise to provide variation of lift with immersion. In effect, the foils perform the dual function of sensing the required lift correction and providing it. Submerged foils, on the other hand, depend upon control surfaces or change in angle of attack of the entire foil to change the lift coefficient and lift force. The submerged foil system has no height sensitivity built in so it must be supplied separately. The foil control system may be made to respond to other quantities than height alone. Craft attitude and accelerations may also be sensed and used as control inputs in order to obtain a truly stabilized or controlled ride.

Another significant difference between surface-piercing and submerged systems is the quality of the ride when fully foilborne. In the craft with surface-piercing foils of normal design, every change in the water surface is transmitted to the craft as a change in lift force because of the change in wetted foil area. Also, in a craft with surface-piercing foils, the performance in a head sea is noticeably different from that in a following sea.

The smoothest ride will be obtained with a craft equipped with fully submerged foils and an autopilot control system. This is capable of measuring the distance of the craft from the water and being adjusted to smooth wave-height response. Control surfaces are also provided either as flaps or as fully rotatable foils or both so that for the most violent corrections made there may not be either cavitation or gross separation of flow. Various sensing devices for submerged foil systems have been tried. One of the simplest is the Hook system in which the water surface ahead of the craft is "felt" by floats on the ends of long arms ahead and on each side of the craft. The wave heights thus anticipated are mechanically transmitted through a relatively simple linkage system to the foils, which are rotated to provide the needed change in lift. Other sensors including electrical probes, velocity and static pressure taps, and sonic altimeters have been proposed.

Fundamental differences in craft control stem from the sensor position in relation to the craft. It has been realized that spatial anticipation by a sensor could improve craft performance by providing lead time. Many craft with zero anticipation have operated successfully, either by the use of computing devices to predict the wave action based on observed values or because the response time of the craft is so short that even corrections applied after the fact kept the craft in a reasonable flight attitude.

As hydrofoil size and speed increase, the problems of control increase. The submerged-foil system provides the best all-weather flying capability. However, the submerged-foil system, whether subcavitating or supercavitating, has an undesirable inherent heave or pitch stability margin and normally requires a continuous automatic control system. The control system of this disclosure comprises the sensing, summing, computing and amplifying equipment to control and stabilize the hydrofoil craft in pitch, roll, and altitude. In addition, the system provides directional stability by coordinating terms, by programming take-offs, and providing functions such as automatic height trim and self-adaptive gain controls.

It is therefore an object of this invention to provide an automatic control system for hydrofoil craft.

Another object of this invention is an autopilot for hydrofoil craft which controls the craft in pitch, roll, yaw and altitude.

A further object of this invention is an autopilot for hydrofoil craft which provides automatic altitude control during all foil-borne operations.

Another object of this invention is an autopilot for hydrofoil craft which limits vertical accelerations to a predetermined value.

A further object of this invention is an autopilot for hydrofoil craft which will damp oscillations, and maintain pitch angle and roll angle to a predetermined limit.

Another object of this invention is an autopilot for hydrofoil craft which permits turns to be automatically co-ordinated or flat at the discretion of the pilot and which automatically varies the trim altitude of the craft during coordinated turns to prevent foil broach.

A still further object of this invention is an autopilot for hydrofoil craft which provides automatic take-off programming to the control surfaces.

Another object of this invention is a novel hydrofoil control system in which the feedback gains are varied as a function of sea state.

A further object of this invention is a novel circuit for automatically controlling, in a hydrofoil craft, the heave damping of the craft as a function of vertical accelerations.

Another object of this invention is a novel hydrofoil control circuit in which altitude bias is provided to prevent foil broach.

Figure 8:
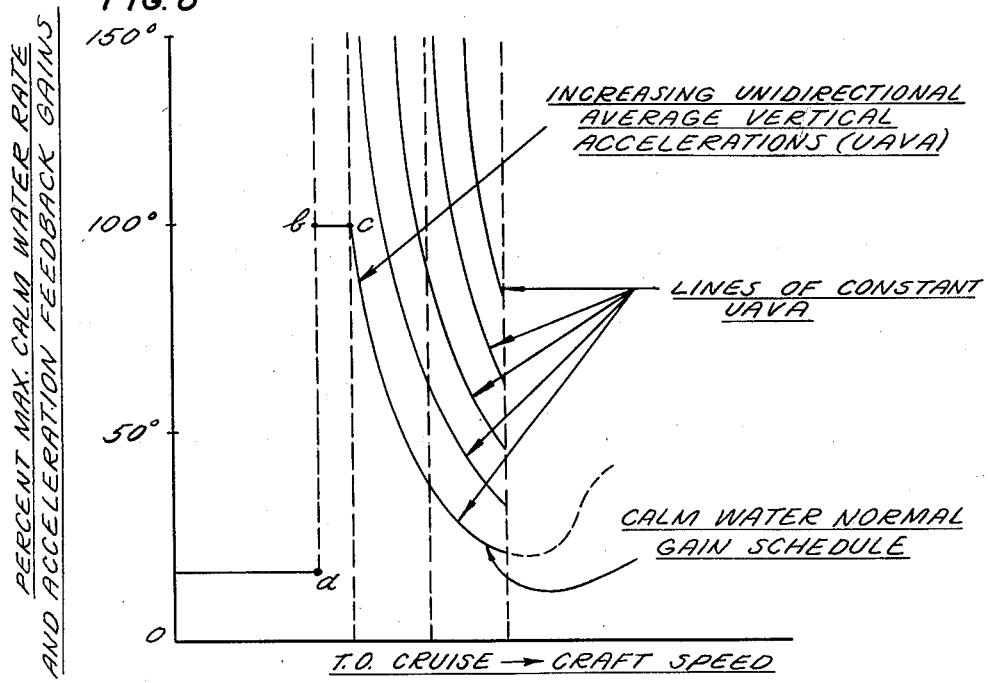
Figure 5:
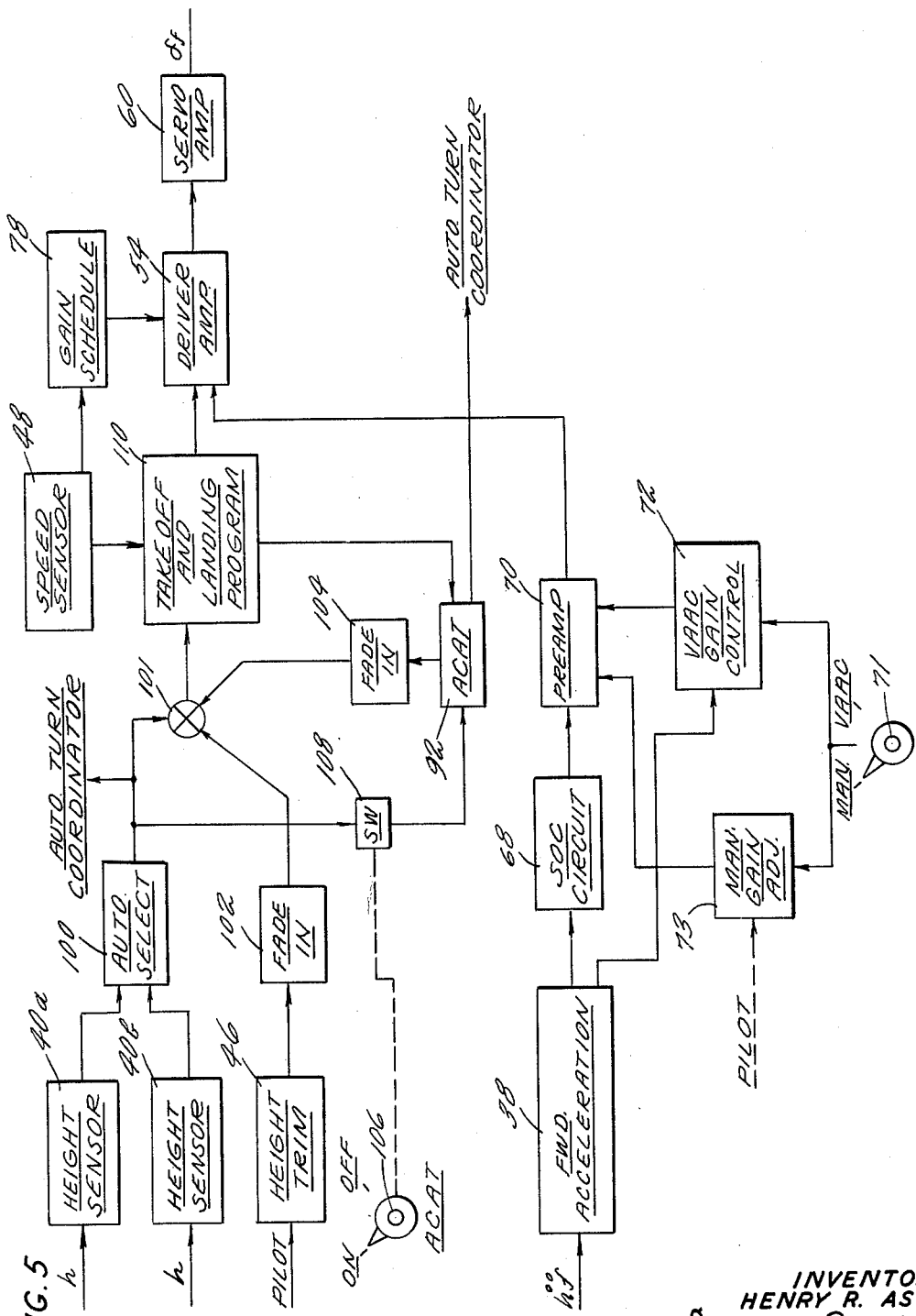
Figure 6:
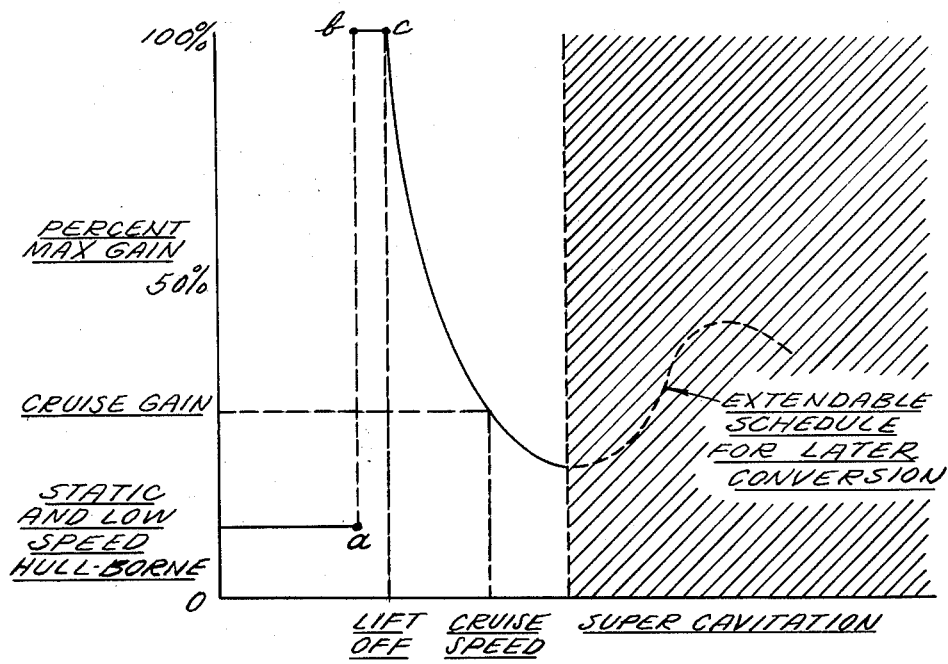
Figure 10:
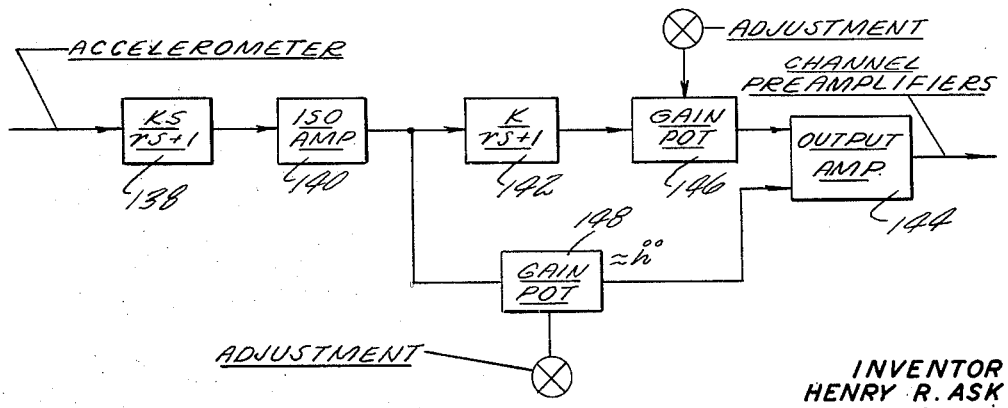

Other objects and a fuller understanding of the invention may be had by referring to the following description and claims, taken in conjunction with the accompanying drawings in which:

FIG. 1 shows a typical hydrofoil craft with a fully submerged foil configuration; and FIG. 2 is a schematic block diagram of the entire autopilot system; and FIG. 3 is a schematic block diagram of the pitch channel of the autopilot system; and FIG. 4 is a schematic block diagram of the roll channel of the autopilot system; and FIG. 5 is a schematic block diagram of the height channel of the autopilot system; and FIG. 6 shows diagramatically a typical gain schedule for the autopilot control loops; and FIG. 7 is a schematic block diagram of the vertical acceleration adaptive control of FIGURES 3 and 5; and FIG. 8 shows the variation in rate and acceleration feedback gains of the system in FIG. 7; and FIG. 9 is a schematic block diagram of the automatic control altitude trim system of FIGURES 4 and 5; and FIG. 10 is a schematic block diagram of the standard operative circuit of FIGURES 3 and 5; and FIG. 11 is a schematic block diagram of the foil-borne steering channel.

FIGURE 1 shows a typical hydrofoil craft 10 having a pair of forward foils 12 and 14. A single foil 16 is attached to the aft portion of the craft. The foils are shown as having flaps 18a and 18b which are moved within certain limits and are similar to the control surfaces of aircraft. A rudder is shown at 19. Propellers 20 and 22 are connected to the rear of the nacelles for powering the craft, but it is understood that other propulsion systems may be used such as aircraft type turbine engines, and that propellers may be positioned either on the front or back of the nacelles.

The basic autopilot system is composed of mechanisms for the control and stabilization of the craft in pitch, roll, yaw and altitude. The system provides for automatic takeoff programming, automatic altitude trim control for variation in sea state and bank angle, flat or co-ordinated turns as desired by the pilot, and automatic variation of system damping to maintain low vertical acceleration under all sea conditions. Indication of system operation may be provided on a control console located in the pilot's cabin 24 along with all switches and controls which establish the modes of system operation.

FIGURE 2 shows in block diagram form the general system configuration. A vertical gyro 30 which gives indications of pitch and roll, a yaw rate gyro 32 and a roll rate gyro 34 are located aft of the center of gravity of the craft 10 in FIGURE 1 near the aft foil station. The aft accelerometer 36 is located over the aft foil 16. A forward accelerometer 38 is located over the forward foils 12 and 14. A height sensor 40 which takes the form of a transducer is located in the bow as far forward as practical. Gyros 30, 32 and 34, accelerometers 36 and 38 and height sensor 40 all feed control signals to the block 42 which contains summing and computing electronics, and which is located near the aft foil station with the control electronics, thereby minimizing cabling problems. In addition, the pilot may adjust the roll, height and pitch of the craft by means of adjustments located in control console in cabin 24. The roll trim is indicated as block 42, the pitch trim as block 44 and the height trim as block 46. A speed or velocity sensor 48 which may be located anywhere in the craft also feeds the summing and computing electronics 42. The electronics sums, schedules, shapes or multiplies the input signals to achieve the correct combination of signals to the driver amplifiers 50, 52 and 54 which control servo actuators 56, 58 and 60. The actuators, in turn, rotate the control surfaces, in this case flaps 18, to stabilize and control the craft to the preset values of trim.

In addition, the control console located in cabin 24 contains pilot operated adjustments 62 for command switching, turn control, manual heave gain control and self test, in addition to the normal on/off control.

FIGURE 3 shows in block diagram form the operation of the pitch channel. The sensors used in the pitch channel consists of the vertical gyro 30 and aft accelerometer 36. Vertical gyro 30 establishes the pitch references and, when summed with the pitch trim signals from block 44, supplies the driver amplifiers 64 and 66 with a proportional error voltage. A pitch rate gyro 45 may also be used in the system. Heave acceleration signals from the aft accelerometer 36 are fed to the SOC circuit 68. The SOC circuit (Standard Operative Circuit) 68, which will be described in detail later, eliminates the effect of accelerometer null shifts and low frequency steady accelerations sensed in turning maneuvers. It integrates in approximate form the acceleration signals to obtain a velocity feedback signal. The acceleration and velocity signals are summed and fed to preamplifier 70 and then fed to the driver amplifiers 64 and 66. The rate and acceleration feedback gains are varied at the preamplifier 70 either manually or automatically at the pilot's discretion. Switch 71, located in cabin 24, allows the pilot to choose the mode of operation. Block 73, manual gain adjustment, allows the pilot to select the gain during manual operation. Automatic gain control is accomplished via the circuit 72 entitled VAAC (Vertical Acceleration Adaptive Control) gain control. VAAC, which will also be described more fully, is sensitive to the short time average value of vertical accelerations in one direction at the forward foil station and varies the preamplifier 70 gains proportionally. Hence, the heave damping of the craft varies, increasing in rough short seas causing the craft to slice through the waves, and decreasing in long rolling seas giving the proportional pitch loop more authority to dynamically maintain the desired trim angle.

In addition, varying the rate stabilizing gains instead of the proportional gains insures that the proportional loops will maintain their position accuracy under all conditions since the position loop gains can be kept at a fairly high value.

The gains of driver amplifiers 64 and 66 are varied automatically as a function of craft speed by gain schedule block 78 responsive to speed sensor 48 to compensate for $$\left(P\frac{V^2}{2}\right)$$

variations on the foils and to keep gains at low levels when the craft is in the displacement mode. See FIGURE 6 for the gain scheduling diagram.

The driver amplifiers 64 and 66 add proportional, rate, and trim signals and amplify the sum to drive the electrohydraulic servo valves 74 and 76. The servo valves control the actuators which rotate the aft flaps 18b in synchronization in the commanded direction.

The roll channel shown in FIGURE 4 has two basic sensors for roll control and stabilization. The vertical gyro 30 provides the reference and proportional error signal and the roll rate gyro 34 provides additional roll damping. For turn coordination, a yaw rate gyro 32 is provided such that yaw rate combined with craft speed can be used as a measure of lateral accelerations.

The roll error and roll rate signals are summed and applied to the port and starboard driver amplifiers 50 and 52 in phase opposition controlled by phase inverter 80 in conjunction with the pitch control signals. In addition, an adjustable roll trim signal is provided from roll trim block 42 to initially trim out craft and channel unbalances. Channel gains are velocity scheduled by gain scheduling block 78 responsive to speed sensor 48. FIGURE 6 shows the gain schedule.

Turn coordination is automatically accomplished partially or fully depending on sea state and altitude. Through operation of a selector switch 82, the pilot has the option of selecting a flat turn or letting the coordinator determine the amount of allowable coordination.

The detailed operation of the auto turn coordinator is as follows:

The yaw rate gyro 32 senses yaw rate. One gyro pickoff is excited by the speed sensor output from sensor 48 such that the yaw rate signal is electrically multiplied by craft velocity. The net signal proportional to lateral acceleration is passed through a cutout switch 84 to a low pass filter 86 which rejects short term accelerations and, hence, reduces cross coupling effects induced by the autopilot. Another gyro pickoff can be furnished to supply yaw rate signals to the steering channel.

The long term lateral acceleration signal passes through a variable limiter 88 to bias roll angle and craft height. Craft height bias is induced to compensate for the rise of the outboard foil during rolling maneuvers. The maximum induced height trim which rolling should produce is given by $1_s \sin \phi$ max. where $1_s$ is one-half the aft foil span. If the altimeter produces a relatively narrow beam, it will not measure the true vertical distance from sensor to water surface in turns where the roll angle exceeds the half angle of the transducer cone. The altitude control loop will, therefore, have some tendency to reduce the craft to an apparent measured altitude. The expression $1_s \sin \phi$ max. can thereby be modified such that the height required for a given roll is somewhat less.

The roll limiter 88 establishes the maximum roll angle for the given conditions. Sensed altitude as from height sensor 40 fed through filter 90 plus the ACAT (Automatic Control-Altitude Trim) signal from block 92 which is proportional to the difference between mean sea level and the time averaged trough depth are summed with a maximum height signal to establish the limits. ACAT 92 will be described in detail later. A lag circuit in the sensed height path (not shown) reduces coupling between altitude and roll when limiting action takes place.

As shown in the diagram, the altitude bias from the turn coordinator passes through an amplitude sensitive circuit 96 such that altitude bias is a function of roll magnitude only.

Not shown on the block diagram is a vertical gyro slow erection cutout. The auto turn coordinator output automatically de-energizes the vertical gyro erection circuit after a predetermined lateral acceleration is exceeded to allow the gyro to free float during sustained turns. This prevents erection to a false vertical.

A gain adjustment 98 is also connected in the roll bias channel.

The height channel inputs shown in FIGURE 5 are obtained from two height sensors 40a and 40b feeding an autoselect circuit 100. In addition, an accelerometer 38 over the forward foils provides an input for increased system damping. The autoselect circuit 100 monitors the operation of the two height sensors 40a and 40b and chooses the still operable sensor in the event of failure of one based on the past short time averaged value of the two sensor outputs.

Sensed height is summed at point 101 with height trim from block 46 through fade-in circuit 102 and the output of ACAT circuit 92. The function of ACAT circuit 92 is to measure the time average value of the trough to mean sea level distance via sensed height signals and provide a proportional decrease in altitude. Essentially, ACAT output is a rough measure of sea state and, therefore, could be called a sea state computer. Barring unusually abrupt sea conditions, ACAT therefore prevents foil broach by adding an incremental amount to the calm water set value of foil immersion. Sensed height is also fed to the auto turn coordinator shown in FIGURE 4 as is ACAT output. The ACAT output and manual trim signals are fed through fade-in circuits 102 and 104 which prevent excessive transients due to switching or manual trim changes. As shown, ACAT circuit 92 may be turned off at the control console by selector 106 which actuates switch 108.

To allow the pilot to preset trimmed altitude prior to takeoff and to minimize drag during the pretakeoff run, the altitude error signal to the forward flap amplifier 54 is gated by the takeoff and landing programmer 110. This prevents a hard over flap during the takeoff run by properly initiating a predetermined altitude error signal, and a forward flap angle, as a function of craft velocity from speed sensor 48. The output of ACAT circuit 92 is controlled by switching in the system gain scheduling circuit 78. Therefore, ACAT bias is zero until lift-off velocity is reached (refer to point c on FIGURE 6). This prevents a large ACAT bias build-up prior to take-off.

The forward accelerometer 38 signal processing is identical to that explained previously for the pitch channel (FIGURE 3). The rate and acceleration feedback sensitivities are varied at the preamplifier 70 via VAAC circuit 72 or manual gain control 73 through switch 71 and the net signal summed at the driver amplifier 54 with the net height error signal. SOC circuit 68 which performs a type of integration as described previously is also connected in the circuit.

All autopilot control loops are gain scheduled by gain variations from circuit 78 at the driver amplifiers. A signal from the velocity sensor 48 varies gains as shown in FIGURE 6. During hull-borne operations, the gains are maintained at a low level such that violent control deflections do not occur due to hull borne motions. At a point (a) the gains are shifted to a maximum value just prior to lift off velocity. Gain is then scheduled from point (c) downward in a manner to compensate for dynamic control surface loading as a function of velocity. The equipment is such that extension of the schedule is easily accomplished in the event that supercavitation does not pose any unusual control problems.

In addition to gain scheduling, switching takes place at point (c) on FIGURE 6 to activate the VAAC and ACAT circuits 72 and 92.

The foilborne steering channel consists of a position feedback loop with redundant electronics to improve steering reliability (FIGURE 11). The mode of operation, normal or standby, is controlled by a switch on the control console. In normal operation, the normal wheel synchro 150 commands rudder position through the switch, normal driver amplifier 152, servo valve 154, actuator 156 and the electrical position feedback transducer 158. A signal from the yaw rate gyro 32, for yaw channel stability, is also fed through the switch and a high pass filter 160 to the normal driver amplifier 152. The high pass filter 166 is employed to prevent a sustained yaw rate signal due to a commanded turn from bucking out the wheel transducer signal. In standby operation, wheel position signals from the standby synchro 162, the filtered yaw rate signals, and the rudder position feedback signals are switched to the input of the standby driver amplifier 164. At the same time, the input to the servo valve 154 and actuator 156 is switched from the normal driver amplifier 152 output to the standby driver amplifier 164 output. A rudder position indicator 166 is provided on the control console to monitor the operation of the steering control loop.

It may be desirable to share the electronics in the foilborne steering system with the hull-borne steering circuits. Additional switching would be involved to connect the driver amplifier outputs to the hull-borne steering actuators. The number of actuators used for hull-borne steering and the need for hull-borne steering redundancy may dictate the need for additional driver amplifiers which can be provided as required.

There is no one set of autopilot sensitivity settings that are optimum for obtaining an acceptable ride and/or an optimum level of performance for all sea, velocity, and craft heading conditions. Previously, manual gain controls were available such that the pilot would make adjustments using his own comfort as the criteria. For example, in long rolling seas of significant wave heights, the craft still has foilborne capability even if the wave amplitudes exceed the maximum allowable hull clearance by contouring the waves. Since the heaving motions will be moderate in frequency, the resulting vertical accelerations would still be within comfort limits. Now, however, assume that the craft passes through the area of long rolling seas into a bay area where waves are a little lower in amplitude but the wavelengths are much shorter. The frequency of wave contact increases and as a net result, the vertical accelerations become larger and the comfort level deteriorates. The craft has inherent attenuation characteristics but in most cases does not smooth out sufficiently the oscillaory accelerations.

FIGURE 7 shows the Vertical Acceleration Adaptive Control, (VAAC), which automatically controls vertical accelerations for all foilborne operations and allows the craft to contour long waves when vertical accelerations are at a minimum. Because the VAAC is self-adaptive in nature, it also insures control system stability by providing additional damping in the event of control performance deterioration, and provides a stability margin to cope with any uncertainties in control design. VAAC may be used with both surface piercing and fully submerged foils.

Referring to FIGURE 7, the forward vertical accelerometer 38 signal is demodulated at 112 from the usual 400 c.p.s. carrier wave. The envelope passes through a high pass filter stage 114 to eliminate low frequency or apparent steady accelerations. The high pass filter cutoff frequency is set significantly lower than the wave motion frequency impinging on the craft during foilborne operations. The resultant analog voltage proportional to the oscillatory acceleration excursions is half-wave rectified at 116 to retain the downward acceleration peaks. The downward peaks are chosen because the measured upward accelerations can in some cases contain components due to wave slap on the hull. The peaks are passed through a relay 117 averaged at 118 by a smoothing filter and fed to an amplifier 120 which varies the gains in the fore and aft vertical acceleration and velocity feedback paths of the autopilot system. A switch 71 on the pilot's console cuts out VAAC for manual gain operations. An interlock 112 is provided to keep VAAC output at zero until the craft is foilborne. The averaging circuit 118 smoothing filter time constants are set lower than the impinging wave motion but not low enough to cause insensitivity to short time average changing conditions.

In summary, the VAAC circuit adjusts the fore and aft heave damping in proportion to the unidirection average vertical accelerations sensed by a vertical accelerometer at the forward foil station. FIGURE 8 shows how the rate and acceleration feedback gains are varied by VAAC in conjunction with the normal gain schedule.

The purpose of ACAT automatic control of altitude trim, shown in FIGURE 9, is to sense changing sea conditions and provide an altitude bias such that broaching of the foils is avoided. It releases the pilot from the necessity of periodic altitude trim changes from visual observation of sea conditions and causes the craft to run at a value of immersion to at all times minimize strut drag.

To minimize strut drag and therefore obtain better operating efficiency, the foils are run at minimum depth of immersion. However, it is important to provide a margin of safety and prevent the foils from piercing the surface, called foil broach. If this occurs, abrupt loss of lift will result and lift will not be immediately restored when the foil re-enters the water. As a result, a crash can occur which could cause injury or great discomfort to passengers and crew.

As seas become rougher and the average set surface to wave trough distance increases, it is necessary for the pilot to manually adjust foil immersion to a greater value and, hence, prevent foil broach. The ACAT system replaces the necessity for periodic manual trimming and more accurately determines what the average foil immersion should be.

Referring to FIGURE 9, an analog voltage of instantaneous altitude from height sensor 40 is fed through a cut-out switch 126 to a high pass filter 128. The high pass filter removes the absolute voltage level and passes the significant sea surface variations. The high pass filter cutoff is set significantly lower than the incidental wave motion frequencies impinging on the craft. The signal then is rectified half wave at 130 to retain the mean sea level to wave trough excursions. The half wave voltage is then filtered at 132 and amplified at 134 to bias the altitude channel with a signal proportional to the wave trough to mean sea distance. The smoothing filter 132 time constants are set lower than the incidental wave motion frequencies but not low enough to make the system insensitive to short time average changing conditions. The incremental bias adds to the minimum value of foil immersion manually set in by the pilot. The amplifier 134 output is summed with trimmed height at the forward driver amplifiers. In addition, ACAT provides a signal proportional to sea height to the auto turn coordinator. This circuit is peculiar to submerged-foil craft as opposed to surface-piercing foil craft.

A console switch cuts out ACAT if the pilot so desires and a gain schedule interlock 136 prevents an ACAT signal buildup until the craft is foil-borne.

The purposes of the Standard Operative (SOC) circuit 68 are to eliminate accelerometer null shift problems, reduce sensed low frequency accelerations due to sustained turns, and to integrate accelerations in approximate form to rate signals.

Rate and acceleration feedback gains are such that even good quality seismic mass accelerometers have null shifts which can cause undesirable steady bias signals to the respective control surfaces. The use of the rate-lag circuit eliminates this problem. In addition, a component of the sustained lateral acceleration is sensed by accelerometers when a banked turn is made. It is necessary, according to normal procedures, to either modify this by a roll angle correction signal or mount the accelerometers on platforms such that their sensitive axis remains vertical. The SOC circuit eliminates this problem by being sensitive only to short term accelerations.

Operation of the SOC circuit is shown in FIGURE 10. The accelerometer output passes through the rate lag 138 which demodulates and acts as a high pass filter to the modulation envelope, and the output is amplified at 140. The acceleration analog signal is integrated at 142 in approximate form to a vertical velocity. The two signals ($h$ and $\dot{h}$) are then summed and amplified at 144. Individual gain control of each path is available 146, 148, to set in the correct proportion of rate and acceleration gains for optimum performance.

The sensor package contains the vertical gyro, the roll and rate gyros, and the vertical accelerometer. The sensor package should be located between the center of gravity and the aft foil station as near the aft struts as possible on the longitudinal axis of the craft. The gyros use a self-contained erection system and synchro pickoffs. The accelerometers are transistorized units containing a seismic mass controlled by a servo system which provides a dynamic balance between acceleration input forces and the feedback force. This restoring force, or the voltage which develops it, is a precise measure of input acceleration.

The height sensor employs a modulated CW system which provides height measurement by detecting a phase shift of the modulation of the reflected signal.

In order to assure that continuous height information is available, the two height sensors employed afford redundant operation. The outputs of the sensors are fed to an autoselect circuit which averages these signals in normal operation, determines that each sensor is operating correctly, and automatically switches out a malfunctioning unit.

The inputs from each height sensor are fed to automatic switches (the selectors) and to the comparator which controls them. These signals pass through the switches to an averaging circuit to provide a height output which is the average of the two signals. This output is fed back to the comparator circuit which compares the inputs to each other and to the time averaged value of the composite signal. Any singular large deviation from the past average will automatically operate the corresponding switch to disconnect the erroneous signal. The averaging circuit will then simply pass the one input signal directly to the output terminals, maintaining a reliable height signal.

The control panel configuration will now be described. Adjustments in height and pitch trim will be made by friction loaded control knobs to prevent accidental shift from the desired setting. A master gain control is provided for manual gain operation. The turn selector, height channel test, autopilot test, altitude control, VAAC control, and take-off program switches may be multi-position wafer switches. The on-off switch may be a simple single throw, single pole toggle to control input power to the system. Visual indication of power applied may be provided by incandescent type lights with the press-to-test feature and dimmer type lens covers. The height-sensor malfunction light is similar but contains a built-in flasher to assure that a malfunction will be noticed immediately. The average height of the craft, the pitch and roll altitude of the craft, and foil position information will be presented on voltmeters scaled to read actual unit outputs.

In order to retain a high order of safety in system operation, self testing features become a very important part of a hydrofoil autopilot's function. However, to maintain simplicity and keep costs to a minimum, it is necessary to trade-off sophistication in favor of techniques which will accomplish almost a complete self test with a minimum of equipment.

In general, the self test equipment applies an amplitude modulated 400 c.p.s. test signal in series with each transducer output, thereby checking the proper operation of all the equipment from and including part of the transducer pickoff out to the flap mechanisms and position indicators. A test signal is also provided both altitude sensors which causes an artificial altitude to be sensed by each transducer, in turn, to check the operation of the auto-select circuit. A signal is also applied simultaneously to both sensors to check channel operation through to flap position.

By proper choice of the modulation frequency used, a quantitative picture of autopilot operation can be obtained; that is, flap position indicators will have calibrated markings which show how much flap angle swing should be experienced when the test signal is applied. This technique actually checks the individual channel frequency response at one point thereby yielding quantitative as well as qualitative data concerning dynamic system operation.

Although the invention has been described in its preferred form with a certain degree of particularity, it is understood that the present disclosure of the preferred form has been made only by way of example and that numerous changes in the details of construction and the combination and arrangements of parts may be resorted to without departing from the spirit and the scope of the invention.

I claim:

1. In an automatic control system for a hydrofoil craft, means for sensing and controlling the heave of said craft in varying sea conditions comprising control surfaces on said craft, means for producing a signal proportional to the vertical accelerations of said craft, means for operating upon said signal to eliminate low frequency accelerations, additional means operating upon said signal for rectifying said signal and retaining the downward acceleration peaks, and means for averaging said downward peaks to produce a control signal for actuating said control surface.

2. In an automatic control system as in claim 1, means for repressing said control signal until said craft is foilborne.

3. In an automatic control system for hydrofoil craft, said craft having control surfaces for controlling the operation and attitude of said craft, means for producing a signal proportional to the roll of said craft, means for producing a maximum craft roll signal which is a function of the yaw and velocity of said craft, and means operable during turning maneuvers of said craft and responsive to said maximum craft roll signal for automatically actuating said control surfaces when said roll signal exceeds said maximum craft roll.

4. In an automatic control system as in claim 3, means for producing a signal proportional to craft height, means for modifying said height signal in response to variations in sea state, and means for varying said yaw signal in response to said modified height signal.

5. In an automatic control system for hydrofoil craft, means for controlling the heave of said craft comprising control surfaces on said craft, means for sensing the vertical accelerations of said craft and producing a first signal, circuit means for operating upon said signal and producing therefrom a second signal proportional to the downward acceleration peaks, and means responsive to said second signal for varying said control surfaces.

6. An automatic control system for a hydrofoil craft comprising means for producing an error signal indicative of the deviation in attitude of the craft from a preselected value, control surfaces on said craft responsive to said error signal for adjusting the attitude of said craft to thereby reduce said error signal, means responsive to vertical accelerations of said craft for producing a feedback signal, means including an amplifier connecting said feedback signal with said error signal, and automatic means responsive to the short time average vertical accelerations of said craft in one direction for varying the gain of said feedback amplifier.

7. An automatic control system as in claim 6 and including means for actuating said automatic means only when said craft is foilborne.

8. An automatic control system as in claim 6 in which said means for producing a feedback signal comprises an accelerometer, the output of said accelerometer being an acceleration signal proportional to the vertical accelerations of said craft, means for integrating said acceleration signal and producing a velocity signal, and means for selectively combining said acceleration signal and said velocity signal to thereby produce said feedback signal.

9. An automatic control system as in claim 8 in which said error signal is indicative of deviations in craft pitch.

10. An automatic control system as in claim 8 in which said error signal is indicative of deviations in craft height above the water.

11. An automatic control system as in claim 8 and including amplifier means for said error signal, and means responsive to craft speed for varying the gain of said error signal amplifier means.

12. In an automatic control system for a hydrofoil craft, said craft having control surfaces connected therewith for controlling the attitude of said craft, turn coordination means for said craft comprising means responsive to the rate of yaw of said craft and craft velocity for producing a signal indicative of craft vertical acceleration, means responsive to craft altitude and sea conditions for modifying said vertical acceleration signal and producing a craft roll limiting signal indicative of maximum and minimum craft roll angle, means for producing a signal indicative of craft roll, and means for actuating said craft control surfaces to vary said craft roll when said craft roll signal varies from said craft roll limiting signal.

13. A control system as in claim 12 in which said means for producing a signal indicative of craft vertical accelerations comprises a yaw gyro for producing a first signal indicative of craft yaw rate, means for producing a second signal indicative of craft velocity, and means for multiplying said first and second signals.

14. In an automatic height control system for a hydrofoil craft, means for automatically varying the height of said craft above the water as a function of variations in sea conditions comprising means for producing a signal indicative of desired craft height, a height sensor for producing a signal indicative of actual craft height, means for comparing said desired height signal and said actual height signal to produce an error signal, additional means acting upon said actual craft height signal for producing a sea-state signal indicative of mean sea level to wave trough excursions, and means responsive to said sea-state signal for modifying said error signal.

15. A control system as in claim 14 in which said additional means for producing a sea-state signal comprises a high-pass filter and a half-wave rectifier means for acting upon said craft height signal.

16. A control system as in claim 14 and including means to render said additional means inoperative until craft lift-off velocity is reached.

17. A control system as in claim 14 and including fade-in circuit means in said desired craft height signal path and in said sea-state signal path to prevent large instantaneous variations in craft height.

References Cited by the Examiner

UNITED STATES PATENTS

| | | | |
|---|---|---|---|
| 2,550,220 | 4/51 | Bussei | 114—66.5 |
| 2,880,384 | 3/59 | Surtees | 244—77 |
| 2,890,671 | 6/59 | Hobday | 114—66.5 |
| 2,996,271 | 8/61 | Lindahl | 244—77 |
| 2,998,946 | 9/61 | Jude et al. | 244—77 |
| 3,081,728 | 3/63 | Wilterdink et al. | 114—66.5 |

FERGUS S. MIDDLETON, *Primary Examiner.*

UNITED STATES PATENT OFFICE
CERTIFICATE OF CORRECTION

Patent No. 3,156,209                  November 10, 1964

Henry R. Ask

It is hereby certified that error appears in the above numbered patent requiring correction and that the said Letters Patent should read as corrected below.

Column 10, line 64, after "roll" insert -- signal --; line 68, strike out "yaw" and insert -- maximum craft roll --; column 12, lines 26 and 29, for the claim reference numeral "14", each occurrence, read -- 15 --.

Signed and sealed this 30th day of March 1965.

(SEAL)
Attest:

ERNEST W. SWIDER                      EDWARD J. BRENNER
Attesting Officer                         Commissioner of Patents